United States Patent [19]
Zheng

[11] 4,435,124
[45] Mar. 6, 1984

[54] VERTICAL AXIS WINDMILL

[75] Inventor: Yea K. Zheng, Nanking, China

[73] Assignee: Nianbilla Company Limited, Hong Kong, China

[21] Appl. No.: 294,785

[22] Filed: Aug. 20, 1981

[30] Foreign Application Priority Data

Aug. 20, 1980 [GB] United Kingdom ............... 8027111

[51] Int. Cl.³ .............................................. F03D 7/06
[52] U.S. Cl. .................................... 416/119; 416/44; 416/46; 416/140
[58] Field of Search ............... 416/119, 139 A, 140 R, 416/41 R, 46, 44 A, 50 A, 51 A, 52 A

[56] References Cited

U.S. PATENT DOCUMENTS

| 498,068 | 5/1893 | Lonning | 416/52 A X |
|---|---|---|---|
| 1,319,174 | 10/1919 | Ochoa | 416/52 A X |
| 1,582,361 | 4/1926 | Welsch | 416/140 |
| 1,592,242 | 7/1926 | Welsh | 416/119 X |
| 1,794,930 | 3/1931 | Spencer | 416/140 X |
| 2,457,514 | 12/1948 | Wood | 416/41 R |
| 4,052,134 | 10/1977 | Rumsey | 416/140 X |
| 4,137,009 | 1/1979 | Telford | 416/119 X |
| 4,180,367 | 12/1979 | Drees | 416/140 R X |

FOREIGN PATENT DOCUMENTS

| 168359 | 5/1951 | Australia | 416/44 A |
|---|---|---|---|
| 860930 | 12/1932 | Fed. Rep. of Germany | 416/140 R |
| 2745862 | 4/1979 | Fed. Rep. of Germany | 416/119 |
| 1486338 | 9/1977 | United Kingdom | 416/119 |

Primary Examiner—Everette Powell, Jr.
Attorney, Agent, or Firm—Oblon, Fisher, Spivak, McClelland & Maier

[57] ABSTRACT

A vertical axis windmill has a blade pivotally connected to a rotatable support structure on an axis passing through its center of gravity which is arranged to lie forward of its aerodynamic center whereby the blade automatically swings outwardly and inwardly when moving on the windward and leeward sides respectively of the axis of rotation of said support means.

7 Claims, 9 Drawing Figures

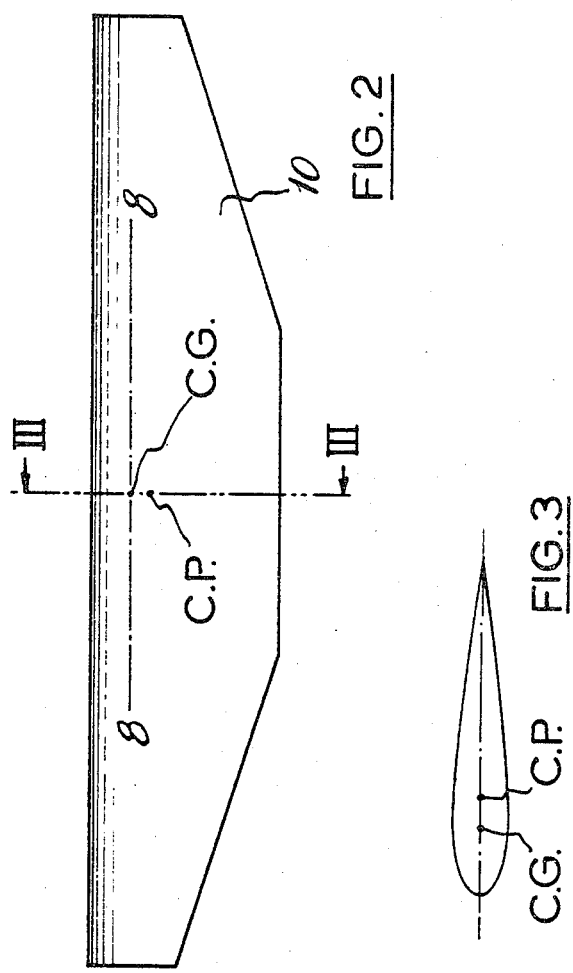

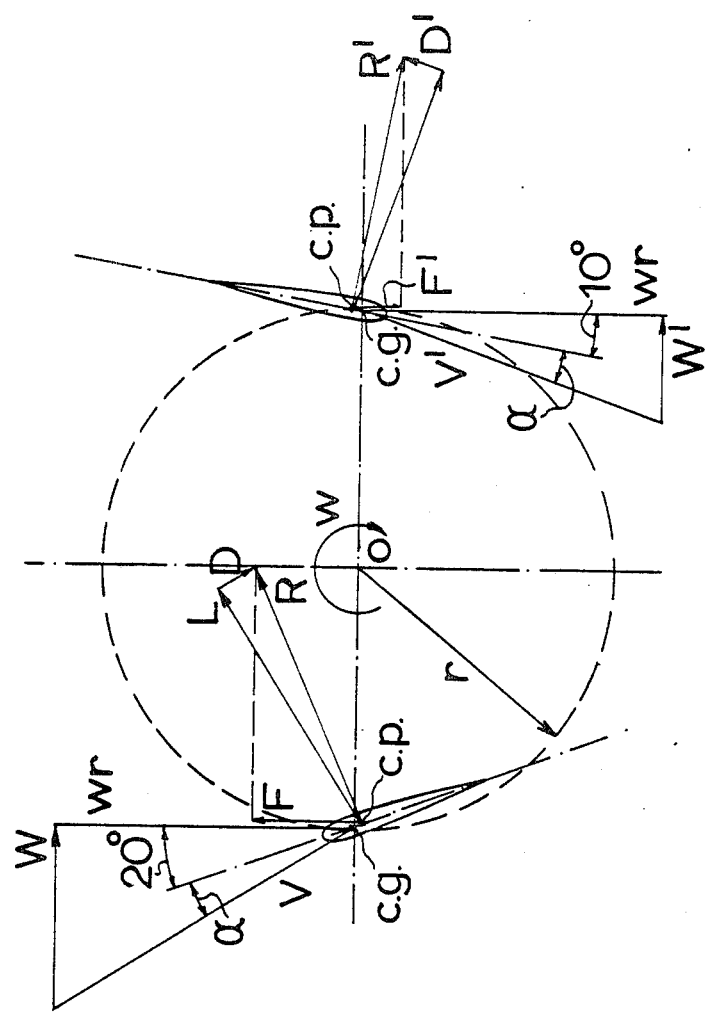
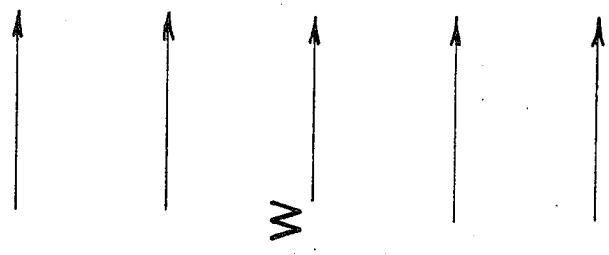
FIG. 4.

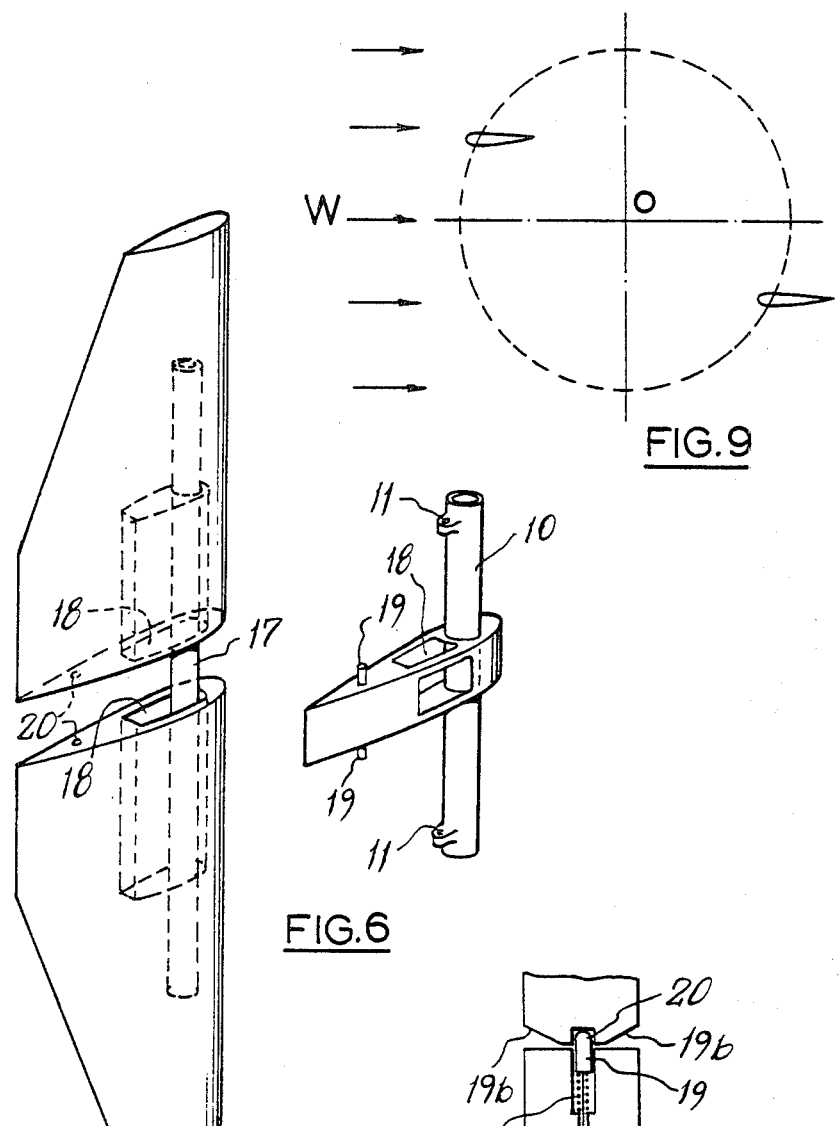

VERTICAL AXIS WINDMILL

BACKGROUND TO THE INVENTION

This invention concerns a vertical axis windmill having automatic swinging blades.

Principal requirements in the design of a windmill are:
1. Low cost of the windmill system.
2. High Efficiency of wind energy conversion.
3. Control of rotational speed of the windmill with varying wind velocity, and
4. Provision of safety means to ensure that the windmill will automatically release its wind load during periods of extremely strong wind and return to operation following such periods.

The conventional horizontal axis windmill is of rather high cost on account of its complex construction but otherwise generally meets these design requirements.

The vertical axis windmill is of relatively low cost on account of its simple construction and thus of considerable interest.

Among recent new designs for vertical axis windmills may be mentioned the improved Darrieus design by Raj Rangi and Peter South of the National Research Council of Canada, the variable geometry vertical axis windmill by P. J. Musgrove of Reading University, England and those designed by The University of Illinois and the McDonald and Douglas Co. Most of these designs are not self-starting and lack some of the design requirements enumerated above.

SUMMARY OF THE INVENTION

It is an object of the present invention to provide a vertical axis windmill which meets all of the design requirements listed above.

According to the present invention, there is provided a vertical axis windmill, each blade of which is freely pivotally connected about a vertical axis passing through is centre of gravity to support means adapted to be rotated by the action of the wind, each blade being designed so that said axis on which it is pivoted lies forward of its aerodynamic centre whereby it (i.e. its leading edge) automatically swings outwardly when moving upstream (i.e. to windward) of and inwardly when moving downstream (i.e. to leeward) of the axis of rotation of said support means.

By "freely pivotally connected" is meant that (except as will later be explained for limiting the angle by which the blades can swing at higher wind speeds) the swinging of the blade about the pivot is unfettered by mechanical means such as springs. As will be seen, the relative positions of the aerodynamic centre and centre of gravity to the pivot axis normally solely determine the attitude of the blades.

BRIEF DESCRIPTION OF THE DRAWINGS

The invention will be further apparent from the following description, with reference to the several figures of the accompanying drawings, which show, by way of example only one form of vertical axis windmill embodying the invention.

Of the drawings:

FIG. 2 is a side elevation of one of the blades of the windmill;

FIG. 3 is a cross-section through the blade on the line III—III of FIG. 2;

FIG. 4 is a diagram of the windmill seen from above illustrating its principle of operation;

FIG. 6 is an exploded perspective view of one of the blades of the windmill;

FIG. 7 is a cross-sectional view of safety mechanism for the blade of FIG. 6;

and FIG. 9 is a diagrammatic view of the windmill from above showing the blades in feathered positions.

DETAILED DESCRIPTION OF THE PREFERRED EMBODIMENTS

Figure 1:
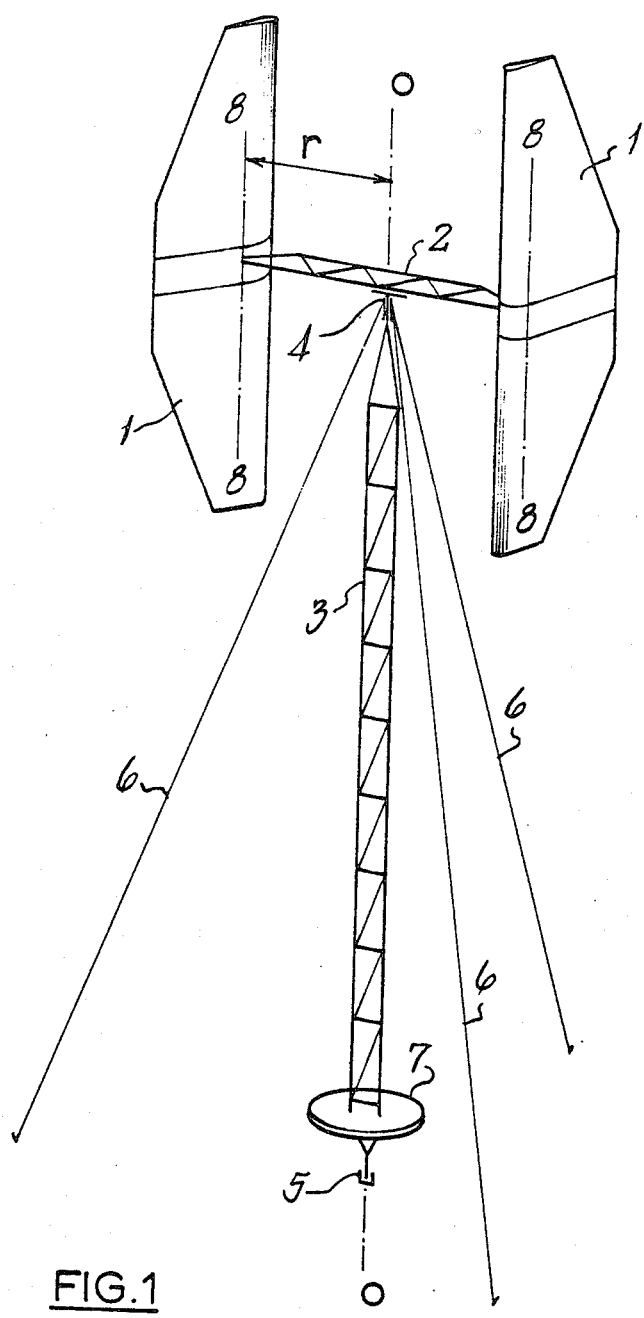
FIG. 1 is a perspective view of the complete windmill.

Referring firstly to FIG. 1, it will be seen that the windmill has two blades 1 of aerofoil cross-section freely pivoted about vertical axes 8—8 at opposite ends of a girder 2 of length 2r respectively. The girder 2 is secured by its centre to a vertical mast 3 mounted for rotation about vertical axis 0—0 by means of an upper bearing 4 anchored by guys 6 and a lower thrust bearing 5 supported on the ground.

The action of the wind, regardless of direction, causes the assembly of blades 1, girder 2 and mast 3 to rotate about axis 0—0 to drive a pulley or gear 7 secured to the mast 3 and from which power may be taken.

As best seen from FIGS. 2 and 3, each of the blades 1 has a straight leading edge, is of aerofoil cross-section and has a shape in plan which tapers outwardly from each of its ends. Each blade 1 is so designed that its centre of gravity C.G. is located about 5% forward of its aerodynamic centre C.P. The axis 8—8 about which each blade 1 is pivoted passes though the centre of gravity of the blade and lies parallel to the leading edge of the blade. Each blade 1 is free to swing about the vertical axis 8—8 through a limited angle, about 20 degrees outwardly and 10 degrees inwardly.

As can be seen from FIG. 4, the wind is blowing from the left with velocity W and the two blades 1 rotate about the vertical axis 0—0 with angular velocity ω at a radius of r. The upstream blade is subject to a resultant relative air stream V and since the aerodynamic centre C.P. of the blade lies behind the axis 8—8 about which the blade is pivoted, the blade automatically swings outwardly to a position, controlled by a regulating device to be described hereinafter, about 20 degrees from the tangent to the circle of rotation about the axis 0—0 giving an angle of attack of α. The resulting lift L and drag D give a resultant aerodynamic force R whose forward component F is the active force which drives the windmill. In a similar manner the downstream blade automatically swings inwardly to a position about 10 degrees from the tangent to the circle of rotation and provides a forward component of force F′ which augments the force F and assists in driving the windmill.

It will be clear that the blades must be pivotally mounted ahead of their aerodynamic centres to ensure automatic swinging of the blades to appropriate angles so than an active forward component of aerodynamic force is present from each blade both when upstream and downstream of the axis 0—0. It is also necessary that the blades are pivotally mounted on axes passing through their centres of gravity to prevent centrifugal forces from interfering with the free swinging of the blades. The automatic swinging property of the blades ensures that the windmill is self-starting.

Figure 5:
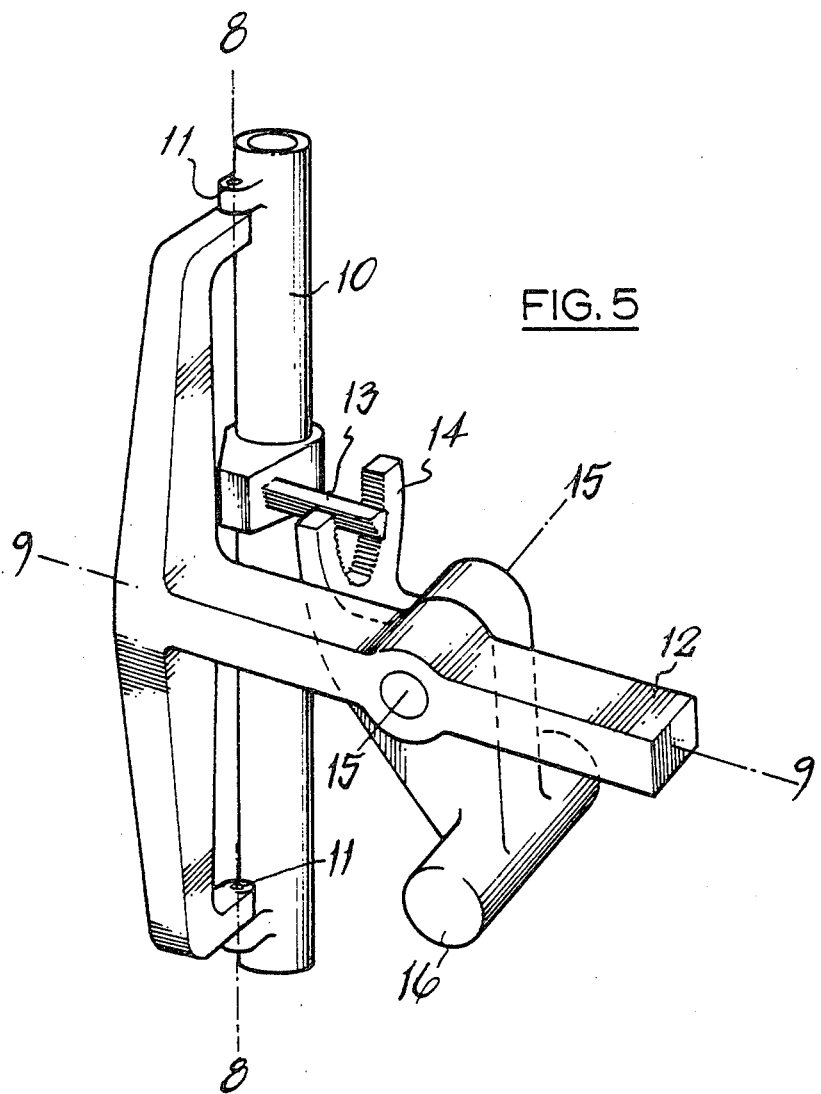
FIG. 5 is a perspective view of a regulator provided for each blade of the windmill.

Referring now to FIG. 5, it will be seen that the regulating device for controlling the swing of each blade comprises a tube 10 upon which the blade 1 (not shown) is mounted. The tube 10 is pivotally connected by means of spaced bearings 11 which define the axis 8—8 to a support member 12 fixed to the end of the girder 2 (not shown). The tube 10 carries a stop pin 13 which cooperates with a centrifugal guide 14. The guide 14 is pivotally connected to the member 12 on a horizontal axis 15—15 which is perpendicular to the longitudinal axis 9—9 of the girder 2. The guide 14 has a counterweight 16.

As the speed of rotation of the windmill increases, centrifugal force on the counterweight causes the guide 14 to rise, thus reducing the clearance between the stop pin 13 and guide 14 and hence the angle though which the blade can swing which in turn effectively reduces the speed at which the windmill can rotate. As the windmill slows the process is reversed and the arrangement thus serves to control the speed at which the windmill rotates.

FIGS. 6 and 7 show mechanism for releasing the blades 1 so that they can assume safe feathered positions as shown in FIG. 9 in the event of excessive wind loads during storm conditions.

As can be seen from FIG. 6, each of the blades 1 is composed of three sections, a narrow centre section located between two outer sections.

The centre section is secured to the tube 10 and the outer sections are connected by a further tube 17 which passes through the tube 10. It will be understood that the two outer sections and tube 17 can rotate as a whole relative to the tube 10 and centre section. All three sections are provided with interior hollow portions 18 which house the support member 12 of FIG. 5.

During ordinary operation, the two outer sections and the centre section are locked together by pins 19 projecting from the centre section and located in bores 20 in the two outer sections so that the blade as a whole is controlled by the regulating device of FIG. 5.

When wind speeds become excessive, however, the pins 19 are retracted by means still to be described against the action of springs 19a located in the centre section to release the outer sections which will then assume the feathered position shown in FIG. 9. When wind speeds return to a safe level the pins 19 are released and resiliently loaded outwards by the springs 19a. After a period the outer sections will pass over the centre section on account of irregular rotation of the windmill with fluctuating wind direction and velocity and the pins 19 will slide over guide ramps 19b against the action of springs 19a to re-engage the bores 20.

Figure 8:
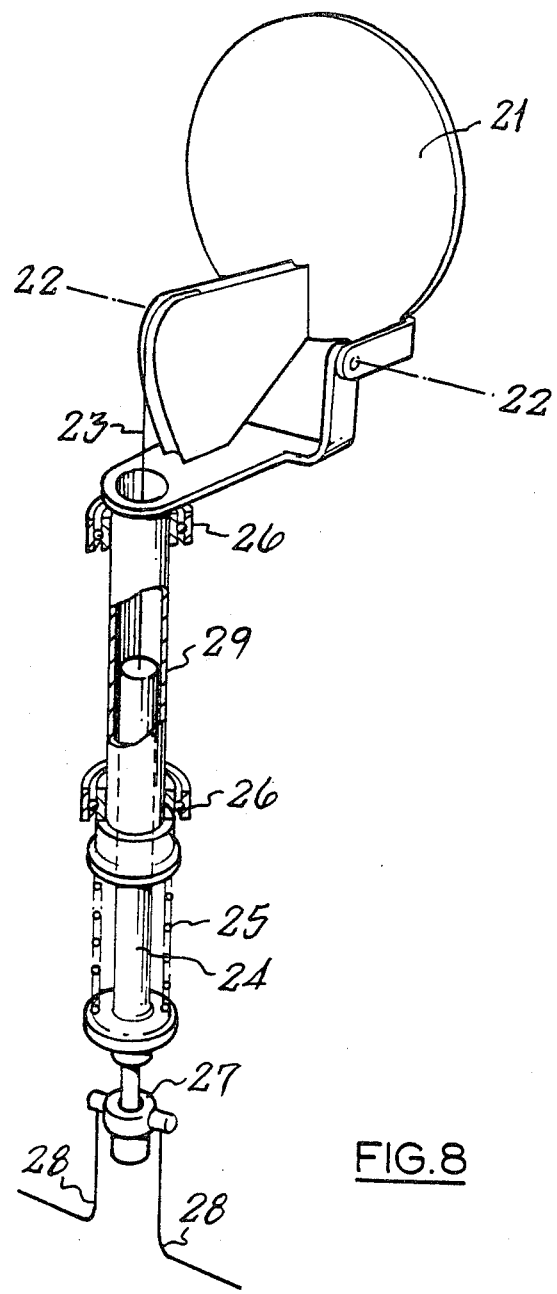
FIG. 8 is a perspective view of wind sensitive means for operating the safety mechanism of FIG. 7.

Turning now to FIG. 8, it will be seen that the wind sensitive assembly for operating the pins 19 and which is mounted at the top of the mast 3, comprises a vane 21 pivotally connected at axis 22—22 to a bracket secured to the upper end of a hollow shaft 29 freely rotatable in bearings 26 secured to the top of the mast 3. A tension wire 23 extends from the vane 21 to a rod 24 slidable within the shaft 29 and loaded downwardly by a compression spring 25. The offset position of the vane 21 (relative to the axis 0—0) ensures that wind force maintains the vane downstream of the wind whilst the mast 3 rotates continuously.

At ordinary operational wind speeds the vane 21 is held forward by the action of the spring 25 and the rod 24 occupies its lowest position. If the wind speed increases to an excessive level the vane 21 tilts rearwardly raising the rod 25 and hence a ring 27 which is freely and rotatably connected with the rod 24, thus pulling wires 28 connected to the ring 27 and extending by way of suitable guide means such as pulleys, to the pins 29 causing them to retract against the action of springs 19a to release the outer sections of the blades 1.

A further wire (not shown) may be provided and attached to the ring 27 and arranged to be pulled manually to arrest operation of the windmill.

It will be appreciated that it is not intended to limit the invention to the above example only, many variations, such as might readily occur to one skilled in the art, being possible, without departing from the scope thereof as defined by the appended claims.

I claim:

1. A vertical axis windmill having at least one blade of airfoil form with a leading edge and a trailing edge, each said blade being freely pivotally connected about a vertical axis passing through the center of gravity of said blade to support means rotatable about an axis by the action of the wind on said blades, each said blade being constructed so that said vertical axis lies closer to said leading edge than does the aerodynamic center of said blade whereby said leading edge automatically swings radially outwardly when moving upstream of, and radially inwardly when moving downstream of, said axis of rotation of said support means, said windmill including regulator means for adjustably defining the limits of an angle through which each said blade can freely swing about said vertical axis, said regulator means being constructed such that said angle decreases with increasing speed of rotation of said support means and so controls the speed of rotation of the windmill, said windmill further including means for releasing said blades from the control of said regulator means and allowing said blades to feather in the event of excessive wind speeds.

2. A vertical axis windmill according to claim 1, wherein said regulator means comprise a pin secured to each blade and cooperating with an associated guide which is pivotally connected to said support means, said guide being weighted so that centrifugal force causes the position of said guide to vary with the speed of rotation of said support structure.

3. A vertical axis windmill according to claim 1, wherein said means allowing each blade to feather comprises each blade including a first part which is associated with said regulator means, the remainder of the blade being larger than said first part and being releasably secured to said first part by means for disconnecting said first part from said remainder to enable said remainder to assume a feathered position in the event of excessive wind speeds.

4. A vertical axis windmill according to claim 2, wherein said means allowing each blade to feather comprises each blade including a first part which is associated with said regulator means, the remainder of the blade being larger than said first part and being releasably secured to said first part by means for disconnecting said first part from said remainder to enable said remainder to assume a feathered position in the event of excessive wind speeds.

5. A vertical axis windmill according to claim 3, wherein the means securing said first blade part to said remainder comprise at least one spring-loaded pin extending outwardly from said first part for engagement with a bore in said remainder of the blade.

6. A vertical axis windmill according to claim 5, including wind sensitive means, said wind sensitive means comprising cable means connected with said pins and a vane which moves to pull said cable means so as to cause said pins to retract when wind speeds are excessive.

7. A vertical axis windmill according to claim 1, wherein said support means comprise a vertical mast and a girder rotatably mounted horizontally at the top of said vertical mast, there being one said blade at each end of said girder.

* * * * *